(12) United States Patent
Kuftedjian et al.

(10) Patent No.: US 6,263,053 B1
(45) Date of Patent: Jul. 17, 2001

(54) SYSTEM AND METHOD FOR PROCESSING TELEPHONE CALLS

(75) Inventors: Ohaness Kuftedjian, Irvine; Cory Lam, Hacienda Heights, both of CA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/191,021

(22) Filed: Nov. 12, 1998

(51) Int. Cl.[7] ....................................................... H04M 1/64
(52) U.S. Cl. ......................... 379/88.2; 379/354; 379/20; 370/396; 707/10; 707/200; 455/414
(58) Field of Search ................................. 379/88.19, 88.2, 379/359, 201; 707/10, 201, 200, 102; 370/396; 455/414, 89

(56) References Cited

U.S. PATENT DOCUMENTS

| 5,339,352 | * | 8/1994 | Armstrong et al. | ............. 379/112 X |
| 5,553,119 | * | 9/1996 | McAllister et al. | ............. 379/88.01 |
| 5,892,820 | * | 4/1999 | Armstrong et al. | ............. 379/70 X |
| 5,943,611 | * | 8/1999 | Mölne | ............. 379/354 X |
| 6,049,799 | * | 4/2000 | Mangat et al. | ............. 707/1 X |
| 6,065,016 | * | 5/2000 | Stuntebeck et al. | ............. 707/200 |
| 6,134,450 | * | 10/2000 | Nordeman | ............. 455/517 |

FOREIGN PATENT DOCUMENTS

| 0 743 781 A2 | 11/1996 | (EP) . |
| 0 806 858 A2 | 11/1997 | (EP) . |
| 0 823 809 A2 | 2/1998 | (EP) . |
| WO 98/28923 | 7/1998 | (WO) . |

* cited by examiner

*Primary Examiner*—Creighton Smith
(74) *Attorney, Agent, or Firm*—Jenkens & Gilchrist, P.C.

(57) ABSTRACT

A telephone call processing system and method for providing operator service. The system maintains a number of customer directories, each customer directory having information pertaining to a number of subscribers of the customer. When an incoming telephone call is received by the system, the system automatically identifies the customer directory corresponding to the customer indicated by the telephone number dialed by the caller. Upon locating the appropriate customer directory, the system automatically switches access by the system operator thereto. Thereafter, the system operator may perform a search in the customer directory for the subscriber who the caller wishes to contact. Upon successfully locating information pertaining to the subscriber in the customer directory, the subscriber information may be communicated to the caller.

21 Claims, 3 Drawing Sheets

SYSTEM AND METHOD FOR PROCESSING TELEPHONE CALLS

BACKGROUND OF THE INVENTION

1. Technical Field of the Invention

The present invention relates to a system and method for processing incoming telephone calls, and particularly to a system and method for providing operator assistance by automatically accessing a number of customer directories.

2. Background and Objects of the Invention

There is a general market requirement for companies and other business entities to provide operator assistance to facilitate the handling of incoming telephone calls. A number of companies, such as companies in the European market, provide operator assistance to their incoming callers both during normal business hours and non-business hours in which the company is closed or otherwise not conducting business. Providing operator assistance seven days a week, 24 hours a day is, for many companies, cost prohibitive.

In existing operator service provider systems, a distinct directory is maintained for each customer (company), with the directories stored in one or more electronic databases. An operator receiving an incoming call for a subscriber of the customer, such as an employee of a customer company, must manually switch to the appropriate customer directory or, in the event all customer directories are maintained in a single database, manually execute a directory search to identify the desired customer group.

Such existing systems, however, present a number of shortcomings. First, operator-initiated directory switching/searching is too slow. In addition, errors are frequently encountered in operator-initiated directory switching/searching due to operator confusion or mistake. Erroneous switching/searching results in the incoming caller being transferred to the incorrect subscriber or even the incorrect customer/company. Further, existing operator service systems require that customer directories be exclusively maintained by the service provider in order to allow for special customer directory functions. As a result, there is a need for a more efficient and error-free operator service.

It is an object of the present invention to provide a telephone call processing system and method for providing an operator service.

It is another object of the present invention to provide an efficient and reliable system and service for managing incoming telephone calls directed to a number of different customers.

Another object of the present invention is to provide substantially error-free searching for subscriber information within the appropriate customer directory.

SUMMARY OF THE INVENTION

The present invention overcomes the shortcomings in existing call processing systems and services and satisfies a significant need for rapidly managing incoming calls directed to a number of different customer companies.

According to the present invention, there is provided a telephone call processing system and method including a server and at least one workstation coupled thereto. The server preferably maintains a plurality of customer directories in which each customer directory includes information regarding its subscribers and/or employees of the customer. The workstation and server preferably include application software which, upon receiving an incoming telephone call, automatically identifies the desired customer directory from the plurality of customer directories and automatically configures an operator interface to point thereto for accessing the desired directory. The software is preferably then capable of searching the identified, desired customer directory for information pertaining to the particular subscriber. The customer directory search may be by subscriber name, department, keyword, or a field defined by the customer. Upon successfully locating information pertaining to the particular subscriber in the identified customer directory, data pertaining to the subscriber, such as name and telephone extension, are presented to the operator. Thereafter, the data may be provided to the caller by, for example, automatic connecting the caller to the subscriber's telephone extension or verbally communicating the subscriber's extension to the caller.

The architecture of the present system further allows each customer directory to be maintained by the respective customer. The server downloads any customer-maintained directories prior to creating a database of directories to which the operator, via the workstation, has access.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE PREFERRED EXEMPLARY EMBODIMENTS

The present invention will now be described more fully hereinafter with reference to the accompanying drawings in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
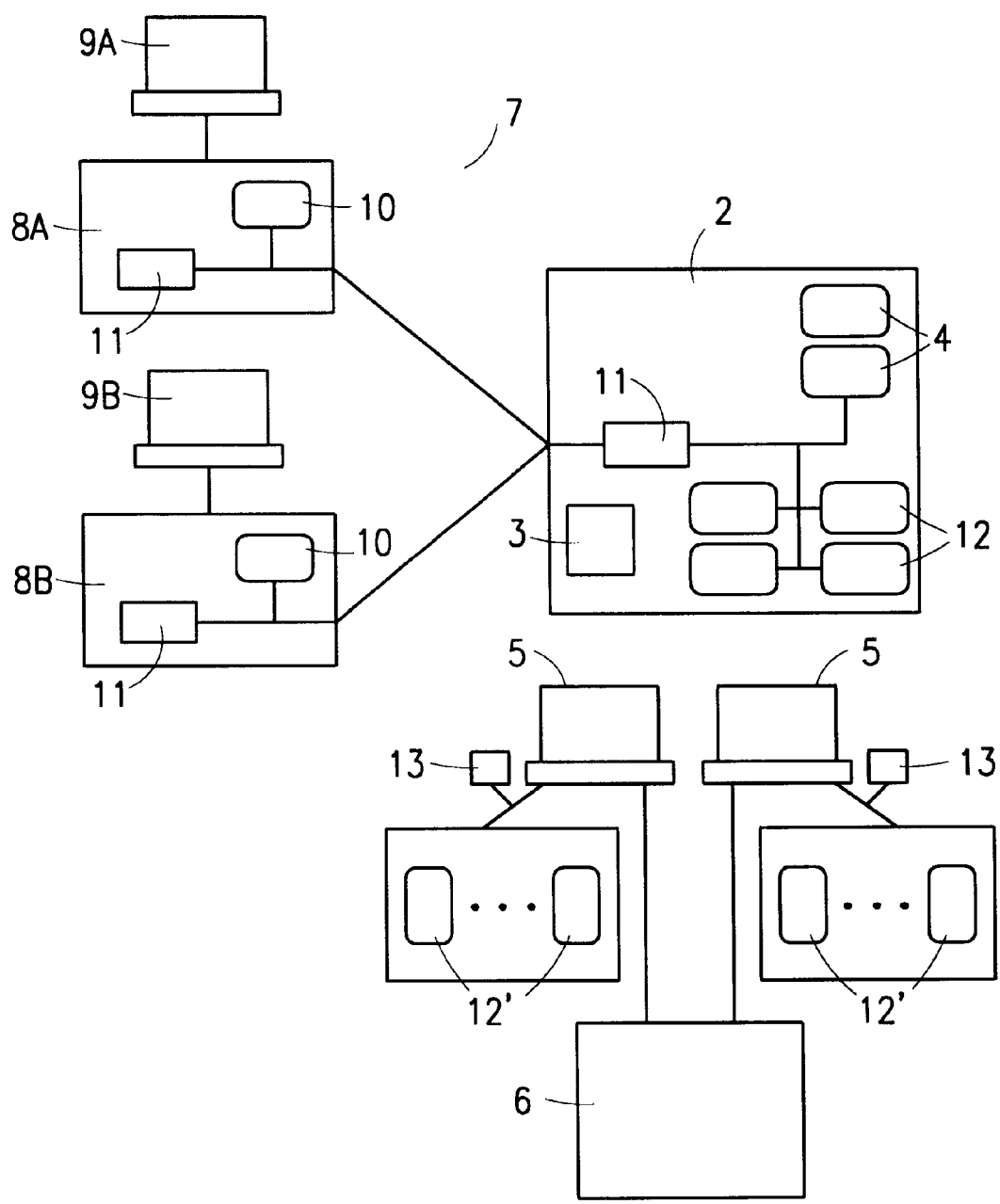
FIG. 1 is a schematic diagram illustrating the telephone call processing system according to a preferred embodiment of the present invention.
Figure 2:
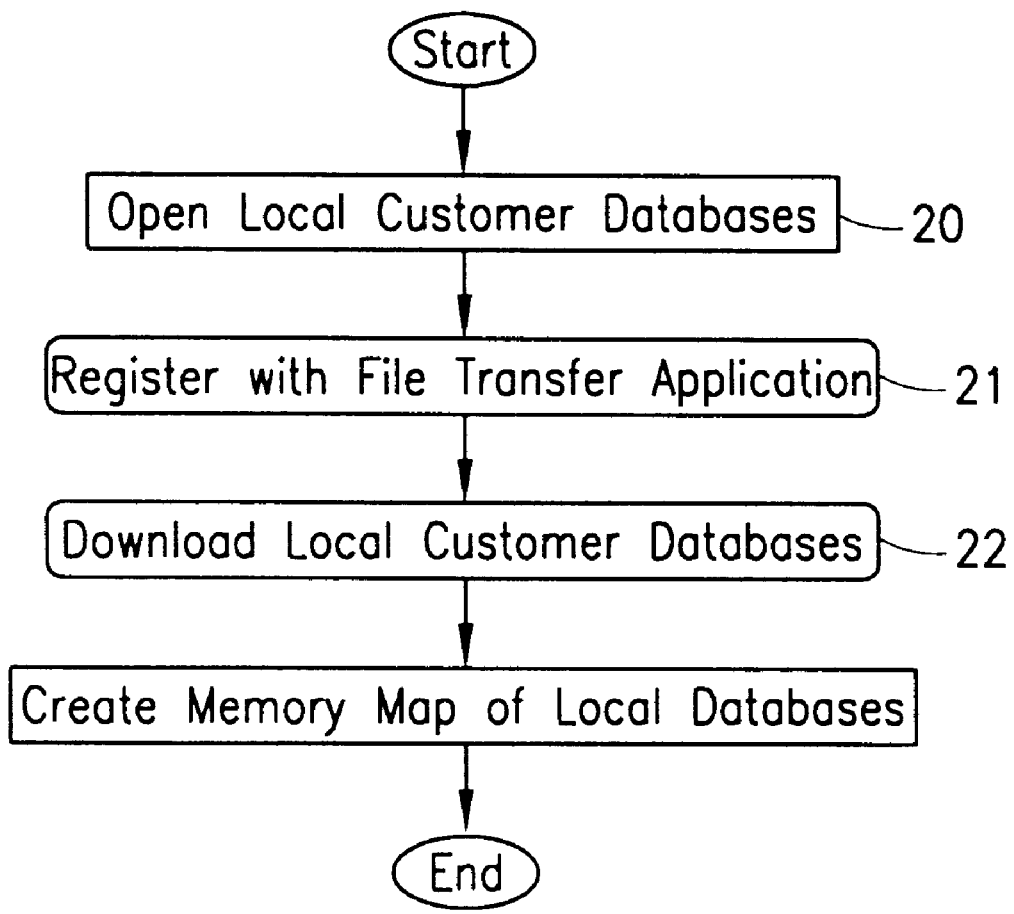
FIG. 2 is a flow chart illustrating an initialization procedure of the telephone call processing system in accordance with the present invention.
Figure 3:
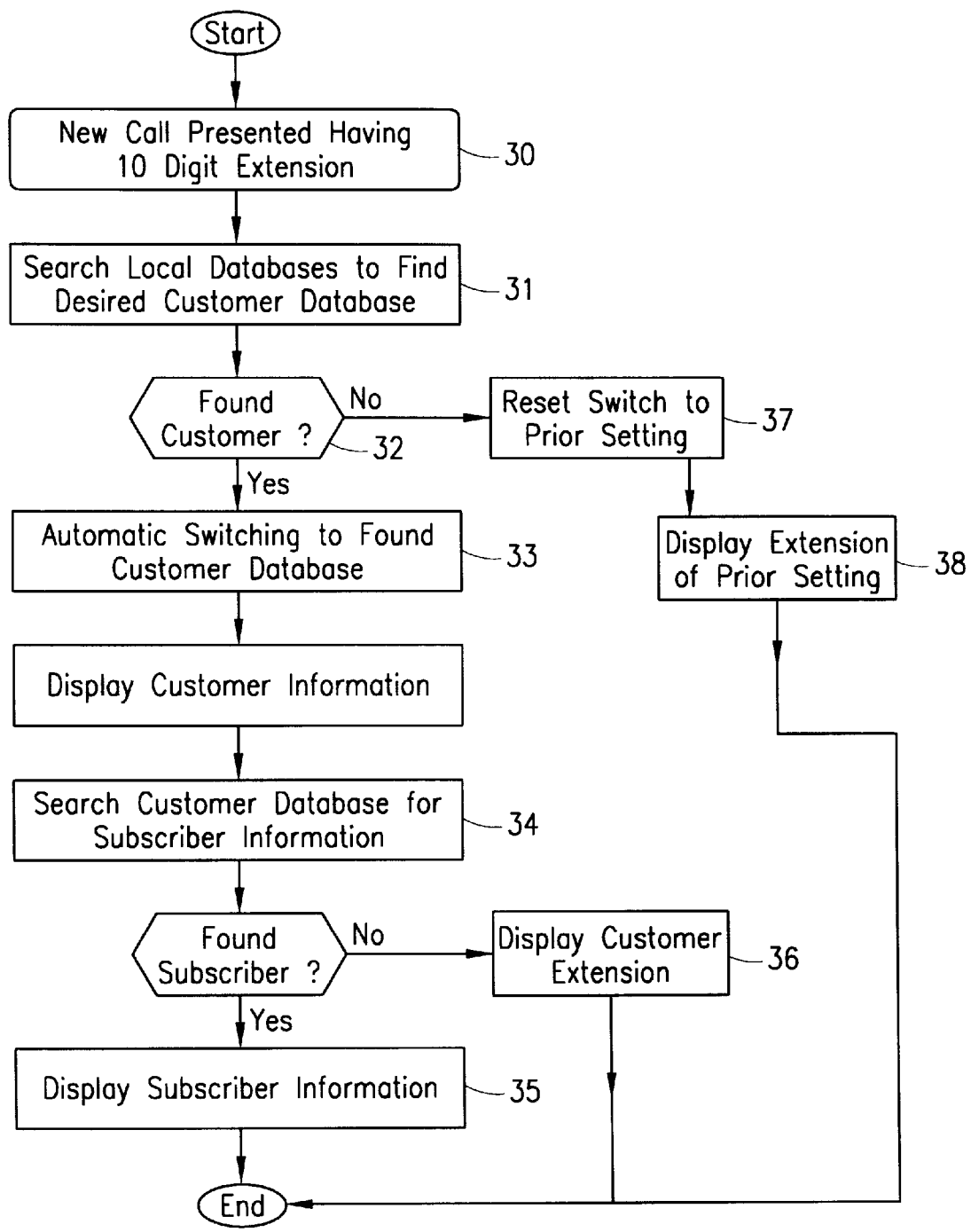
FIG. 3 is a flow chart illustrating the operation of the telephone call processing system according to the preferred embodiment of the present invention.

Referring to FIGS. 1–3, there is shown a telephone call processing system 1 for managing incoming telephone calls directed to a number of different customers. Telephone call processing system 1 generally includes server 2 having stored therein application software 3 and one or more customer directories 4. Server 2 is preferably coupled to one or more operator workstations 5 with which operators utilize call processing system 1 for managing incoming telephone calls. Each workstation 5 is preferably operatively coupled to telephone network 6 from which workstations 5 receive incoming telephone calls. Server 2 and operator workstations 5 are preferably maintained by the operator service provider.

Telephone call processing system 1 may preferably further include a computer network 7 to which server 2 and operator workstations 5 are linked. Network 7 preferably includes customer servers 8A and 8B, each of which is operatively coupled to server 2 to communicate data therebetween. Network 7 preferably further includes customer workstations 9A and 9B which are coupled to customer servers 8A and 8B, respectively. Customer servers 8 and customer workstations 9 are preferably maintained by customers of the operator service provider.

There are a number of advantages in telephone call processing system 1 including customer-maintained servers 8 and workstations 9. First, those customers having servers 8 and workstations 9 are capable of providing in-house operator service to their callers during certain times of the day, such as during normal business hours, while allowing the operator service provider to provide operator assistance during other times of the day. Because many customers may potentially receive service from the same operator service provider, operator service fees are reduced relative to the cost involved in a customer providing its own operator service throughout the entire day.

In addition, customers having customer server 8 and customer workstation(s) 9 may configure and update their own customer directory 10 to suit their particular business. For instance, such customers may regularly define their respective directories 10 to include virtually any information which may be helpful in locating any of its subscribers and/or employees. In addition to a customer directory 10 having each subscriber's first and last name and corresponding extension, the customer directory 10 may be defined to include department information, supervisor and secretarial information for each subscriber, and facsimile information. In this way, a customer directory 10 may be easily customized and updated without having to rely on the operator service provider to perform the customization.

Further, the confidentiality of a customer directory 10 is heightened due to customers of the operator service provider having their own server 8 and workstation(s) 9 on which customer directories 10 are maintained. Added security may include software which limits access to those customer directories 10 to certain operators of the operator service provider.

It is understood that it is not necessary for customers of the operator service provider to possess their own server 8 and workstation 9, and that the operator service provider may alternatively maintain customer directories 4 and provide operator service to such customers during all hours of the day.

Telephone call processing system 1 preferably allows an operator to access each customer directory 4 and 10 so that the operator may efficiently handle an incoming call directed to any customer served by the operator service provider. The present system preferably utilizes a file transfer service 11, such as Remote Data Server (RDS), which resides on service provider server 2 and each customer server 8 and controls the transfer of customer directory data therebetween. The file transfer service 11 replicates customer directories 10 from customer servers 8 into separate local directories 12 on service provider server 2. For those customer directories 4 which are not remotely maintained by customer servers 8, the file transfer service 11 replicates customer directories 4 from a central directory on service provider server 2 into separate local customer directories 12. Local customer directories 12 may be thereafter downloaded onto an operator workstation 5 as explained below. Operators managing incoming calls directed to customers having a local customer directory 12 access the downloaded customer directories 12' (FIG. 1) to perform operator-assisted service.

The application software 3 which is utilized by operators at workstations 5 to provide operator service preferably includes an interface 13 which processes operator input information and which displays to the operator requested information on workstation 5. Specifically, an operator may manually switch between different downloaded customer directories 12' which causes information pertaining to the customer corresponding to the selected customer directory 12' to be displayed to the operator. Additionally, an operator may initiate a subscriber search within the selected downloaded customer directory 12'. If the search located the selected subscriber information therein, the interface 13 then displays the subscriber information to the operator on workstation 5. Thereafter, the operator may provide the located subscriber information to the caller seeking same, either verbally or electronically.

In accordance with a preferred embodiment of the present invention, upon receipt of a new incoming call, the operator service application automatically searches the downloaded customer directories 12' for the particular customer directory 12' which corresponds to the ten digit incoming telephone number. The incoming telephone number may, for example, be the general or main telephone number for the customer. In response to an affirmative identification of the customer directory 12' searched for in the downloaded customer directories 12', the operator service application automatically switches or points thereto. In this way, the operator is automatically presented with the appropriate local customer directory 12' in which to initiate a search for a specific subscriber therein. Significantly, because the automatic searching for and the switching to the appropriate downloaded customer directory 12' may occur in a sub-second time interval, the time involved in providing operator service is substantially reduced.

FIG. 2 illustrates the procedure for initializing the application according to the present invention. When the operator service application is first started, local customer directories 12 are opened for transfer at step 20. At step 21, the operator service application registers with the file transfer service 11 on service provider server 2. Upon confirming that the operator service application is subscribed to the file transfer service 11, file transfer service 11 downloads local customer directories 12 from service provider server 2 to the operator workstation 5 on which the operator service application is executing (step 22). The operator service application identifies those customers having customer directories 12 downloaded onto a workstation 5 and creates a memory mapped file or snapshot thereof. The downloaded customer directories 12' are accessed by the operator service application to facilitate the operator service provided to incoming callers.

FIG. 3 illustrates the operation of the call processing system 1. Once the operator service application is initialized, a ten digit incoming telephone call may be received at a workstation 5 at step 30. The operator service application then preferably automatically searches all of the downloaded customer directories 12' for the customer database indicated by the received ten digit incoming call at step 31. Upon a positive identification of the customer database 12' corresponding to the customer indicated by the incoming call at step 32, the operator service application automatically switches the customer database accessible to the operator at a workstation 5 to the immediately identified customer database 12' (step 33). At this time, the operator service application presents the customer's name and other information to the operator, who may thereupon provide the information to the caller. With the immediately identified customer database 12' now being accessible, the operator may initiate a search at step 34 therein for the particular subscriber. The search may, for example, be based upon the caller verbally communicating to the operator the name of the subscriber the caller wishes to contact. In the event information regarding the particular subscriber was found in the identified customer director 12', such information is presented to the operator at step 35. Subscriber information presented to the operator may include, among other information, the subscriber's extension. The operator may then communicate the subscriber information to the caller, either verbally or electronically, such as by transferring the caller to the subscriber's extension.

In the event no information pertaining to the subscriber was found in the identified customer directory 12', the customer's main telephone number is presented to the operator at step 36. At this point, the operator may attempt another search in the identified customer directory 12' using different information.

In the event the operator service application could not locate the customer directory 12' corresponding to the customer identified by the incoming telephone call, the operator service application switches or points to a previously identified customer director 12' at step 37 and displays the ten digit telephone number dialed by the caller at step 38. At this point, the operator may manually switch to another customer directory 12' in order to perform a search therein.

Although the preferred embodiments of the system and method of the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. A system for processing telephone calls, comprising:
   storage means for maintaining a plurality of customer databases, each customer database including a listing of subscriber information;
   a means for receiving an incoming telephone call;
   a means for automatically identifying a customer database from the plurality of customer databases based upon the incoming telephone call;
   a means for automatically providing access from a previously identified customer database to the automatically-identified customer database;
   a means for searching for information pertaining to a particular subscriber in the automatically-identified customer database; and
   a means for providing subscriber information pertaining to the particular subscriber to a system operator based upon affirmatively locating the subscriber information in the automatically-identified customer database.

2. The system of claim 1, wherein:
   the means for providing subscriber information includes a means for displaying the subscriber information to the system operator.

3. The system of claim 1, further including:
   a means for providing information related to the automatically-identified customer database to the system operator.

4. The system of claim 3, wherein:
   the means for providing information related to the customer database includes a means for displaying the provided information to the system operator.

5. The system of claim 1, further including:
   a means for providing the subscriber information pertaining to the particular subscriber to the caller placing the incoming call.

6. The system of claim 1, wherein:
   subscriber information in the customer databases includes data categorized into a number of distinct data fields; and
   the means for searching subscriber information includes a means for searching for the particular subscriber in a customer database based upon searching for data appearing in any data field.

7. The system of claim 6, wherein:
   a data field in a customer database is defined by the customer corresponding to the customer database.

8. The system of claim 1, wherein:
   the storage means comprises a plurality of distinct data storage devices, each data storage device stores at least one customer database.

9. The system of claim 8, wherein:
   at least one of the data storage devices is maintained by the customer corresponding to the customer database stored therein.

10. The system of claim 8, further including:
    a server having a data storage device therein and operatively coupled to each of the other data storage devices; and
    the system includes a means for copying customer databases from the other data storage devices to the server.

11. The system of claim 1, further including:
    a means for selectively switching to another customer database upon the subscriber information not be located in the automatically-identified customer database.

12. The system of claim 1, further including:
    a plurality of servers, each server having at least one customer database stored therein; and
    a plurality of workstations, each workstation being operatively coupled to a distinct server.

13. A method for processing telephone calls, comprising the steps of:
    maintaining a plurality of customer databases, each customer database including a listing of subscriber information;
    receiving an incoming telephone call;
    automatically identifying a customer database from the plurality of customer databases based upon the incoming telephone call;
    automatically providing access from a previously identified customer database to the automatically identified customer database;
    searching for information in the automatically-identified customer database pertaining to a particular subscriber; and
    providing the subscriber information pertaining to the particular subscriber to a system operator upon affirmatively locating the subscriber information in the automatically-identified customer database.

14. The method of claim 13, wherein:
    the step of providing subscriber information includes the step of displaying the subscriber information to the system operator.

15. The method of claim 13, further including the step of:
    providing information related to the automatically-identified customer database to the system operator following the step of automatically identifying.

16. The method of claim 15, wherein:
    the step of providing information related to the automatically-identified customer database includes the step of displaying the provided information to the system operator.

17. The method of claim 13, further including the step of:

providing subscriber information pertaining to the particular subscriber to the caller placing the incoming telephone call.

18. The method of claim 13, wherein:

subscriber information in a customer database is categorized into a number of data fields; and the step of searching for information includes the step of searching for information appearing in any data field for the particular subscriber.

19. A computer program product including a computer readable medium having computer readable program code means embodied thereon, for a system for processing incoming telephone calls, the computer program product comprising:

first computer readable program code means for maintaining a plurality of customer databases, each customer database including a listing of subscriber information;

second computer readable program code means for automatically identifying a customer database from the plurality of customer databases based upon an incoming telephone call;

third computer readable program code means for automatically providing access to the automatically identified customer database to an operator of the system;

fourth computer readable program code means for searching for information from the automatically-identified customer database pertaining to a particular subscriber; and fifth computer readable program code means for providing the subscriber information pertaining to the particular subscriber to a system operator in response to affirmatively locating the subscriber information in the automatically-identified customer database.

20. The computer product of claim 19, wherein:

the fifth computer readable program code means includes a sixth computer readable program code means for visually displaying the subscriber information to the system operator.

21. The computer product of claim 19, wherein:

a customer database comprises a listing of subscriber information categorized into a number of distinct data fields; and the fourth computer readable program code means includes a sixth computer readable program code means for searching for data appearing in a data field in the customer database listing selected by the system operator, the searched-for data pertaining to the particular subscriber.

\* \* \* \* \*